Aug. 15, 1939.    H. BRIAND    2,169,519
DEVICE FOR REGULATING THE ACTION OF BRAKES
Filed Dec. 30, 1936    3 Sheets-Sheet 1
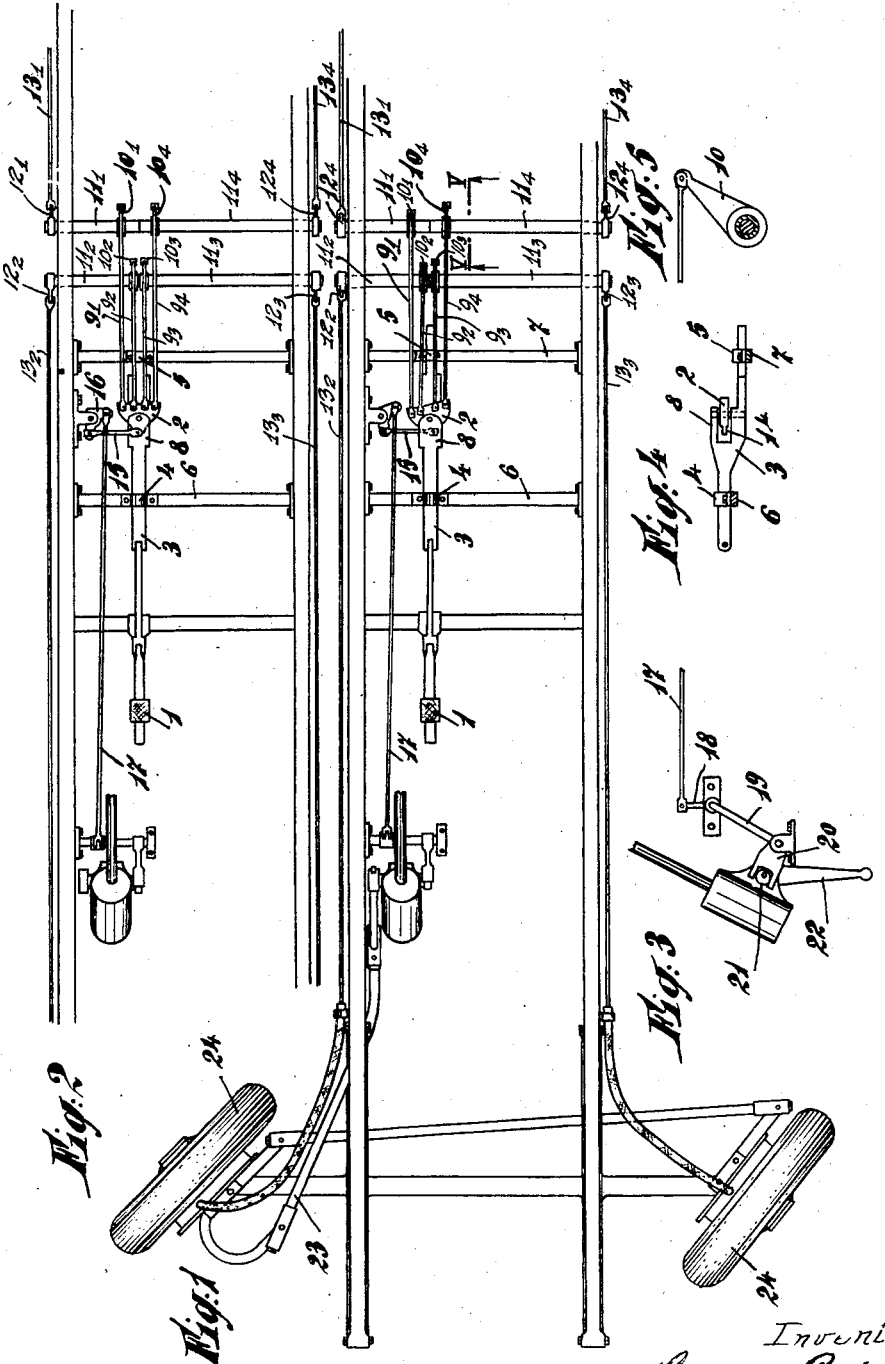

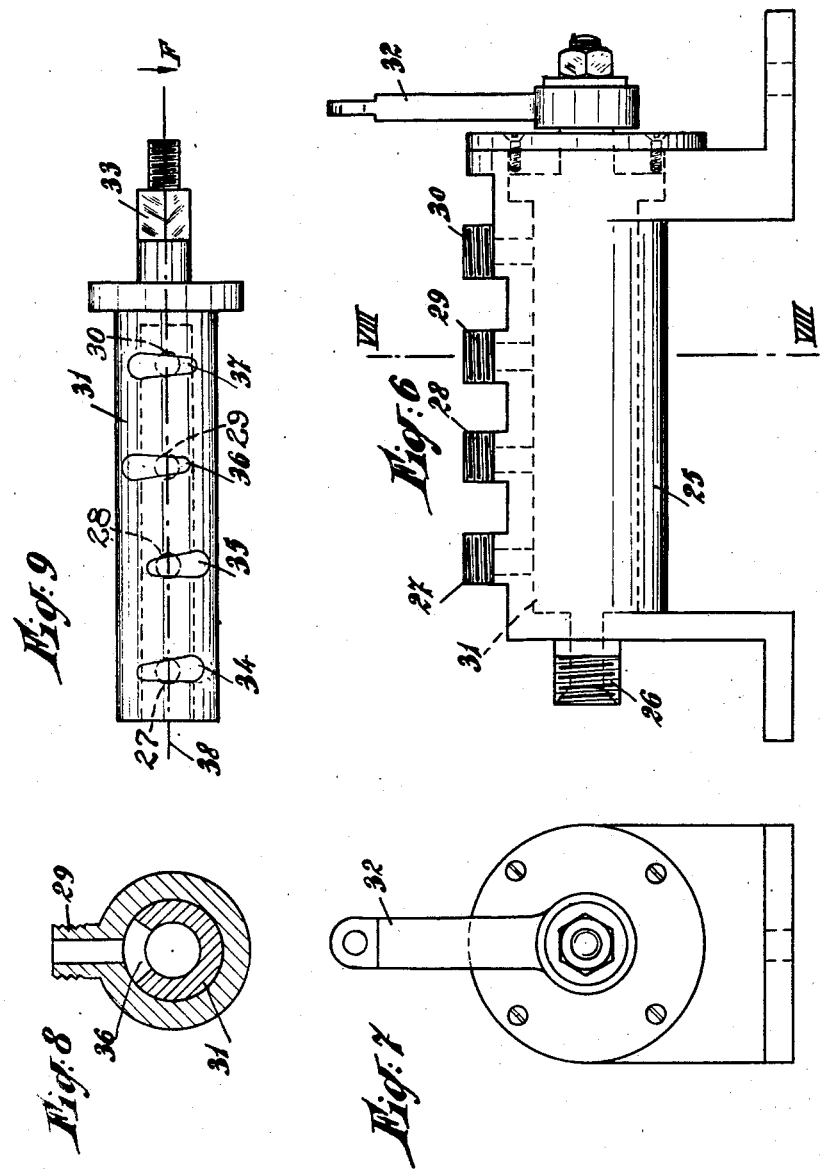

Patented Aug. 15, 1939

2,169,519

UNITED STATES PATENT OFFICE 2,169,519

DEVICE FOR REGULATING THE ACTION OF BRAKES

Henry Briand, Paris, France

Application December 30, 1936, Serial No. 118,414
In France January 3, 1936

7 Claims. (Cl. 188—152)

The present invention has for its object a device for regulating the action of brakes and is applicable more particularly to motor road vehicles and permits of automatically modifying the braking force exerted on the wheels during movement along a curve according to whether they are at the outer or inner radius of the curve.

It is well known how dangerous in certain circumstances the application of brakes can be when a vehicle is executing a turning movement.

In effecting variation in the braking forces to which the wheels are subjected in accordance with the direction and radius of the curve, the device which forms the subject of the present invention permits of avoiding slipping or sliding which is frequently the consequence of the application of brakes during a turning movement, whilst it also facilitates steering of the vehicle.

This device, which acts on the transmission members connecting the pedal or other central element to the brakes of the individual wheels, is actuated automatically by the steering wheel device. On the other hand, it does not become effective when the vehicle is travelling in a rectilinear path and the wheels then are braked in the normal manner. If, on the other hand, the steering wheels are turned, there is relative modification of the individual braking actions on the wheels of the vehicle in accordance with the direction of turning and in proportion to the angle of turning.

The regulation of the braking force may be dependent on time, that is to say by a variation of the moments of application of the brakes to the various wheels, or may be dependent upon the magnitude of the forces exercised on the wheels, or on both these factors.

Thus it is possible, for example, to construct the device in such manner that it produces an elongation of the elements which connect the central control member, such as the pedal or lever, to certain of the wheels according to the direction of turning, or it may produce a shortening of the other elements, or both these effects may be produced simultaneously. The brake blocks or shoes controlled by the longest connections find themselves brought more closely together on their drums, and at the moment of braking they first come into frictional contact with these drums; in addition, they are forced more closely against the drums for the same displacement of the pedal or the lever.

In one form of construction of this nature, the central control element displaces the connections leading to the various brakes through the intermediary of a swing-tree to which the steering member of the vehicle can impart an angular displacement about an axis.

It will be understood that other arrangements may be employed for example for unequally distributing the force exerted on the pedal between the various connections.

In the case of hydraulic brakes, there may be provided between the control pump connected to the pedal or lever and the tubes connecting this pump to the individual brakes of the wheels a control device which modifies the transmission of the pressure in the pipes according to the direction and magnitude of turning of the steering wheels. This device may be formed, for example, by a distributor or cock of which the container has, for the purpose of transmission of the individual brakes, slots or ports of a cross-section which can be varied according to the angular position of the said container which is itself determined by the direction of the vehicle.

Two forms of construction of the invention are illustrated in the annexed drawings, in which—

Fig. 1 is a diagrammatic plan view of the chassis of a motor vehicle provided with a brake regulator in conformity with the invention. In this figure, the rear wheels which are not steering ones are not shown, although the connections leading to them are shown. In addition, the front wheels are assumed to be turned.

Fig. 2 shows the central part of the chassis and the regulator, in the case in which the wheels are not turned.

Fig. 3 is a perspective view of the steering member showing a mechanical connection between this member and the regulating device.

Fig. 4 is an elevation of a member connecting the brake control pedal with a pivoted swing-tree.

Fig. 5 is a detail view in section along the line V—V of Fig. 1.

Figs. 6—9 show a form of construction of the invention applicable to hydraulic brakes.

Fig. 6 is a side elevation of a device for controlling the circulation of liquid actuated by the steering wheel of the vehicle.

Fig. 7 is an end portion of this distributor.

Fig. 8 is a section on the line VIII—VIII of Fig. 6.

Fig. 9 shows the movable container of this device in plan.

Figure 11:
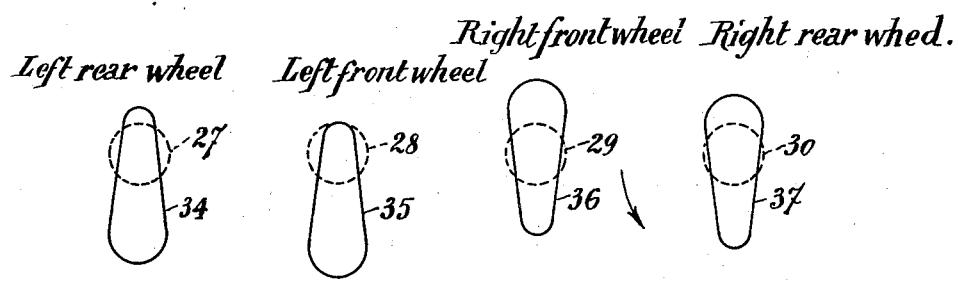
Figure 10:
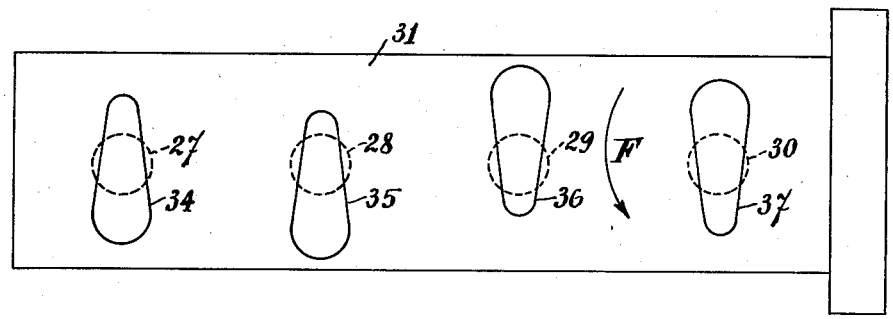
Figure 12:
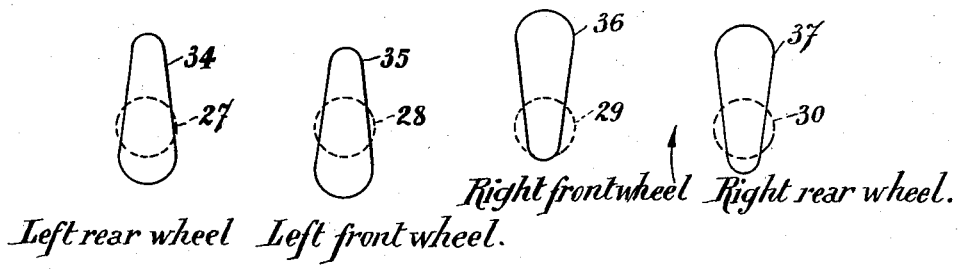

Fig. 10 is a view on a larger scale of the arrangement of Fig. 9, showing the orifices of the distributing device in their mean position, which corresponds to the vehicle running along a straight line;

Figs. 11 and 12 show the position of the orifices of the distributing device, respectively, when the vehicle is turning toward the right and when it is turning toward the left.

In the form of construction shown in Figs. 1-5, the brake control pedal 1 actuates the swing-tree 2 through the medium of a slide 3 guided at 4 and 5 on cross members 6 and 7 of the chassis. This slide 3 includes, as shown by Fig. 4, a fork-shaped part 8 in which is mounted the swing-tree 2. This swing-tree carries four rods $9_1$, $9_2$, $9_3$, and $9_4$, and which control the brake of the respective wheels. These rods $9_1$, $9_2$, $9_3$, and $9_4$ are, on the one hand, pivotally connected to the swing-tree, and on the other hand to respective levers $10_1$, $10_2$, $10_3$ and $10_4$ each connected to a sleeve $11_1$, $11_2$, $11_3$ and $11_4$, respectively. These sleeves which correspond to the respective wheels are mounted on axles transverse to the chassis, and can rotate freely on these axles. Their rotation under the action of the levers $10_1$, $10_2$, $10_3$, and $10_4$ determines the force of the brakes of the wheels through the medium of levers $12_1$, $12_2$, $12_3$ and $12_4$ and rods or Bowden wires $13_1$, $13_2$, $13_3$, and $13_4$ connected to these brakes. The swing-tree 2 has a tail piece 14 on which is pivotally mounted a connecting rod 15 secured to a member 16; this member is, on the other hand, connected by a rod 17 to a lever 18 mounted on an axle 19, and on which is fixed a forked lever 20 the branches of which enclose a cam 21. This cam is mounted on the pivot of the steering lever 22, which is connected in known manner by a rod 23 to the steering wheels 24. The cam 21 is so shaped that, when the turning angle of the front wheels is nil, that is to say when the vehicle is travelling in a straight line, the swing-tree 2 assumes a neutral position, as shown in Fig. 2, under the action of this cam and the lever system 20, 18, 16 which connects it to the said cam. In this position, displacement of the control pedal 1 causes uniform braking of the four wheels.

If, on the other hand, the front wheels are turned, the cam 21 transmits a certain angular movement to the lever 20 and the swing-tree 2 is caused to pivot about its axle either to the left or to the right according to the direction of turning of the wheels. In the example shown in Fig. 1, the wheels have been turned to the right and the swing-tree 2 has assumed a position in which it exerts a certain pull on rods $9_1$ and $9_2$ which correspond respectively to the right-hand front and rear wheels, that is to say to the wheels situated on the inside of the curve, and on the contrary exerts a thrust on rods $9_3$ and $9_4$ acting on the left-hand front and rear wheels. The brake shoes of the respective wheels are then located at different distances from the brake drum, the distance being minimum for the rear wheel on the right hand side, a bit greater for the front wheel on the same side, still a bit greater for the front wheel on the left hand side, and maximum for the rear wheel on the left hand side. If pressure is then applied to pedal 1, it is obvious that the times and intensities of the braking actions correspond to these respective different positions of said brake shoes. Furthermore, the braking forces absorbed by the two wheels situated on the same side of the vehicle are unequal. The order and intensity of braking of the wheels can be classified as follows, starting from the first and more intensively braked wheel, to wit: right rear wheel, right front wheel, left front wheel, left rear wheel.

It will be understood that in subjecting the wheels situated on the inside of the curve to a higher braking force than those situated on the outside of the curve, steering of the vehicle on a curve is facilitated.

The modified form of construction shown in Figs. 6-9 relates to a case where hydraulic brakes are employed and it concerns the distributor for controlling the feed of liquid under pressure to the individual hydraulic brakes of the wheels (which are not shown on the drawings because they are not part of the invention and can be of any suitable conventional type).

This distributor controls the cross section available for the flow of liquid under pressure to the respective brake devices in accordance with the position of the steering means. This distributor valve includes two elements adapted to fit in each other, to wit casing 25 and a plug 31 of cylindrical shape adapted to turn in said casing. Liquid under pressure is fed to casing 25 through a connection 26, and outlet connections 27, 28, 29 and 30 carried by said casing are adapted to feed said liquid to the respective brakes. The right-hand end of plug 31 is open so that the liquid flowing into casing 25 through connection 26 freely enters said plug. The plug and its casing are coaxially mounted in each other about axis 38. On its right-hand end, plug 31 is provided with an extension 33 of square section which projects from casing 25 when said plug is inserted therein. An arm 32 fitting on said square part is operatively connected with the steering means through any suitable means, for instance a system including a rod 17, an axis 19, a lever 20 and a cam 21 as above described with reference to Figs. 1 to 3.

Plug 31 is provided with tapering slots 34, 35, 36 and 37 located opposite the inner ends of connections 27, 28, 29 and 30 of casing 25, respectively. Ports 34 and 35 are tapering in a direction opposed to that of ports 36 and 37.

When the steering means are in neutral position, that is to say when the vehicle is running along a rectilinear path, the position of plug 31 is that shown by Figs. 9 and 10, in which the passages resulting from the super-position of ports 34, 35, 36 and 37 to the respective inner ends of connections 27, 28, 29 and 30 are substantially equal. Therefore, if the brakes are applied, the transmission to the four brakes will be the same and the braking actions equal.

If, on the contrary, the vehicle is turning, arm 32 brings plug 31 into a different angular position, turning it for instance in the direction of the arrow F of Fig. 9 in such manner that the orifices 34, 35, 36, 37 of this piece come, with respect to the stationary orifices 27, 28, 29 and 30, into the relative positions shown by Fig. 11. As a result of this rotation, the section through connection 27 is reduced by the displacement of port 34. The section through 28 is also reduced, but to a higher degree. On the contrary, the section through 29 is increased and the section through 30 is increased to a higher degree. As these connections 27, 28, 29 and 30 communicate respectively to the rear and front wheels on the left-hand side and the front and rear wheels on the right-hand side, and the rotation of plugs 31 corresponded to a turning of the vehicle toward the right, the times for transmitting to the wheels the braking actions are modified in the following manner.

On the rear right-hand side wheel (orifices 30 and 37) the application of the brake is effected very quickly; on the front right-hand side wheel (orifices 29 and 36) the application of the brake is a little delayed; on the rear left-hand side wheel (orifices 27 and 34) the delay is greater, finally on the front left-hand side wheel (orifices 28 and 35) the delay is maximum.

When the vehicle is turning toward the left, piece 31 turns in the opposite direction to arrow F and the orifices come to occupy the relative positions shown on Fig. 12. The brake is quickly applied on the rear left-hand side wheel (orifices 27 and 34); it is slightly delayed on the front left-hand side wheel (orifices 28 and 35); it is delayed to a greater extent on the rear right-hand side wheel (orifices 30 and 37), and it is maximum on the front right-hand side wheel (orifices 29 and 36).

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a vehicle including four wheels, individual brakes for said wheels, and steering means for at least some of said wheels, a regulating device which comprises, in combination, a central brake control member, individually variable means for adjustably connecting said control member with said brakes, respectively, a swing tree for adjusting said connecting means, respectively, a tail carried by said swing tree, and means for interconnecting said tail and said steering means, including a cam rigid with a portion of said steering means.

2. In a vehicle including four wheels, a brake for each of said wheels, and steering means for at least some of said wheels having a neutral position corresponding to a rectilinear path of travel of said vehicle, a control device which comprises, in combination, a central brake control member, transmission means for operatively connecting each of said brakes with said control member, the four transmission means which correspond respectively to the four brakes being individually adjustable, and correcting means operative by said steering means for varying the adjustment of said transmission means, in response to a displacement of said steering means from said neutral position, differentially for the front and rear brakes of each lateral pair of wheels and in opposed ways for the two lateral pairs of wheels respectively, and differentially for the right and left pairs of wheels, respectively, so that upon braking operation of said control member when said steering means is out of neutral position the order of importance of the braking efforts transmitted by said member to said respective brakes is the following, starting by the highest, first the rear brake on the side toward which the vehicle is turning, then the front brake on the same side, then the front brake on the other side of the vehicle and the rear brake on said last mentioned side.

3. In a vehicle including four wheels, a brake for each of said wheels, and steering means for at least some of said wheels having a neutral position corresponding to a rectilinear path of travel of said vehicle, a control device which comprises, in combination, a central brake control member, transmission means for operatively connecting each of said brakes with said control member, the four transmission means which correspond respectively to the four brakes being individually adjustable, a part movably carried by said vehicle coacting with said four transmission means so that the respective adjustments of said four transmission means are caused to vary, in accordance with movements of said part, differentially for the front and rear brakes of each lateral pair of wheels and in opposed ways for the two lateral pairs of wheels respectively, and differentially for the right and left pairs of wheels respectively, and means operatively connecting said part with said steering means so that, upon braking displacement of said control member, when said steering means is out of neutral position, the order of importance of the braking efforts transmitted by said member to said respective brakes is the following starting by the highest, first the rear brake on the side toward which the vehicle is turning, then the front brake on the same side, then the front brake on the other side, and finally the rear brake on said last mentioned side.

4. In a vehicle including four wheels, a brake for each of said wheels, and steering means for at least some of said wheels having a neutral position corresponding to a rectilinear path of travel of said vehicle, a control device which comprises, in combination a central brake control member, transmission means for operatively connecting each of said brakes with said control member, the four transmission means which correspond respectively to the four brakes being individually adjustable, a part rotatably carried by said vehicle coacting with said four transmission means so that the respective adjustments of said four transmission means are caused to vary in accordance with angular displacements of said part, differentially for the front and rear brakes of each lateral pair of wheels and in opposed ways for the two lateral pairs of wheels respectively, and differentially for the right and left pairs of wheels respectively, and means operatively connecting said part with said steering means so that, upon braking displacement of said control member, when said steering means is out of neutral position, the order of importance of the braking efforts transmitted by said member to said respective brakes is the following, starting by the highest, first the rear brake on the side toward which the vehicle is turning, then the front brake on the same side, then the front brake on the other side, and finally the rear brake on said last mentioned side.

5. In a vehicle including four wheels, a brake for each of said wheels, and steering means for at least some of said wheels having a neutral position corresponding to a rectilinear path of travel of said vehicle, a control device which comprises, in combination, a central brake control member, transmission means for operatively connecting each of said brakes with said control member, the four transmission means which correspond to the four brakes respectively being individually adjustable, a part rotatably carried by said vehicle coacting with said four transmission means so that the respective adjustments of said four transmission means are caused to vary, in accordance with angular displacements of said part, differentially for the front and rear brakes of each lateral pair of wheels and in opposed ways for the two lateral pairs of wheels respectively, and differentially for the right and left pairs of wheels respectively, a rotary cam operatively connected with said steering means, means, coacting with said cam, for transmitting rotation thereof to said rotatable part so that, upon braking displacement of said control member, when said steering means is out of neutral position, the order of importance of the braking efforts transmitted by said member to said respective brakes is the following, starting by the highest, first the rear brake on the side toward which the vehicle is turning, then the front brake on the same side, then the front brake on the other side, and finally the rear brake on said last mentioned side.

6. In a vehicle including four wheels, a brake for each of said wheels, and steering means for at least some of said wheels having a neutral position corresponding to a rectilinear path of travel of said vehicle, a control device which comprises, in combination, a central brake control member, mechanical transmission means for operatively connecting each of said brakes with said control member, the four transmission means which correspond respectively to the four brakes being individually adjustable, a part rotatably carried by said vehicle interconnected with said four transmission means so that the respective adjustments of said four transmission means are caused to vary, in accordance with angular displacements of said part, differentially for the front and rear brakes of each lateral pair of wheels and in opposed ways for the right and left lateral pairs of wheels respectively, and differentially for the right and left pairs of wheels respectively, and means operatively connecting said part with said steering means so that, upon braking displacement of said control member, when said steering means is out of neutral position, the order of importance of the braking efforts transmitted by said member to said respective brakes is the following, starting by the highest, first the rear brake on the side toward which the vehicle is turning, then the front brake on the same side, then the front brake on the other side and finally the rear brake on said last mentioned side.

7. In a vehicle including four wheels, a brake for each of said wheels, and steering means for at least some of said wheels having a neutral position corresponding to a rectilinear path of travel of said vehicle, a control device which comprises, in combination, a central brake control member, hydraulic transmission means for operatively connecting each of said brakes with said control member, the four transmission means which correspond respectively to the four brakes being individually adjustable, a part rotatably carried by said vehicle adapted simultaneously to control the respective sections of said four transmission means so that the respective adjustments of said four transmission means are caused to vary, in accordance with angular displacements of said part, differentially for the front and rear brakes of each lateral pair of wheels and in opposed ways for the two lateral pairs of wheels respectively, and differentially for the right and left pairs of wheels respectively, and means operatively connecting said part with said steering means so that, upon braking displacement of said control member, when said steering means is out of neutral position, the order of importance of the braking efforts transmitted by said member to said respective brakes is the following starting by the highest, first the rear brake on the side toward which the vehicle is turning, then the front brake on the same side., then the front brake on the other side and finally the rear brake on said last mentioned side.

HENRY BRIAND.